United States Patent [19]

Swanson

[11] 4,186,291
[45] Jan. 29, 1980

[54] SWITCH AND THROTTLE LEVER COMBINATION FOR USE IN CONJUNCTION WITH SNOWMOBILE ENGINE SPEED LIMITING SYSTEM

[75] Inventor: Larry D. Swanson, Horicon, Wis.

[73] Assignee: Deere & Company, Moline, Ill.

[21] Appl. No.: 878,547

[22] Filed: Feb. 16, 1978

[51] Int. Cl.² .............................................. H01H 9/06
[52] U.S. Cl. .............................. 200/61.86; 200/61.87; 200/157
[58] Field of Search .................. 200/61.86, 157, 61.85, 200/161, 61.87, 157, 161; 123/198 D, 198 DA, 198 DB, 198 DC; 180/5 R, 103 R, 82 R, 99

[56] References Cited

U.S. PATENT DOCUMENTS

| 3,563,219 | 2/1971 | Mieras | 123/118 |
| 3,581,720 | 6/1971 | Hemphill et al. | 123/118 |
| 3,694,596 | 9/1972 | Carlson | 200/61.87 |

*Primary Examiner*—Gene Z. Rubinson
*Assistant Examiner*—Morris Ginsburg

[57] ABSTRACT

A snowmobile is provided with an electrical control system for controlling the R.P.M. of the snowmobile engine. Forming part of the control system is a normally open, operator-presence sensing switch arranged in conjunction with a specially mounted throttle control lever such that the switch is closed anytime an operator's thumb is depressing the throttle control lever. The electrical control system is operative when the switch is open to maintain the engine R.P.M. at a value below that necessary for effecting engagement of a speed-responsive variable speed drive connecting an output shaft of the engine with a drive track of the snowmobile, and is operative when the switch is closed to maintain the engine R.P.M. at a value below that considered excessive for the engine and drive components.

1 Claim, 4 Drawing Figures

SWITCH AND THROTTLE LEVER COMBINATION FOR USE IN CONJUNCTION WITH SNOWMOBILE ENGINE SPEED LIMITING SYSTEM

BACKGROUND OF THE INVENTION

The present invention relates to a safety control system for limiting the R.P.M. of a snowmobile engine below drive train engagement speed when an operator-presence sensing switch is open and for limiting the R.P.M. of the engine at a predetermined maximum speed when the switch is closed. More specifically, the present invention relates to a manner of arranging the aforementioned switch in conjunction with and for selected actuation by a specially mounted throttle control lever.

At an SAE meeting held at Rhinelander, Wisconsin on Feb. 18, 1976 certain employees of the assignee of the instant case presented a proposal for using an operator-presence sensing switch in circuit with an electrical engine R.P.M. control system such as to form a safety control system for preventing snowmobile "runaway" in the event of a stuck throttle and for preventing the engine from overspeeding as might happen should a drive element break to suddenly separate a relatively large load from the engine when the throttle is wide open. The switches proposed for use were not arranged such as to be easily and efficiently operated by the operator without fatigue and/or undue restraint of movement.

SUMMARY OF THE INVENTION

According to the present invention there is provided a novel operator-presence sensing switch and throttle control lever combination for use with a snowmobile having an engine R.P.M. limiting control system.

An object of the invention is to provide a switch arranged for operation by a throttle control lever such that the switch will open anytime the control lever is released by the operator regardless of whether or not the throttle closes.

A more specific object is to provide a throttle lever connected to a throttle control cable and carrying a pivot pin received in a lost motion slot located in a pivot retainer, the pivot pin being operable to close a normally open switch upon initial movement of the lever whenever the operator depresses the lever for effecting the opening of the throttle and the switch being capable of opening against the pin anytime the operator releases the lever even if the throttle sticks in an open position.

These and other objects will become apparent from a reading of the ensuring description together with the appended drawing.

DESCRIPTION OF THE PREFERRED EMBODIMENT

Figure 1:
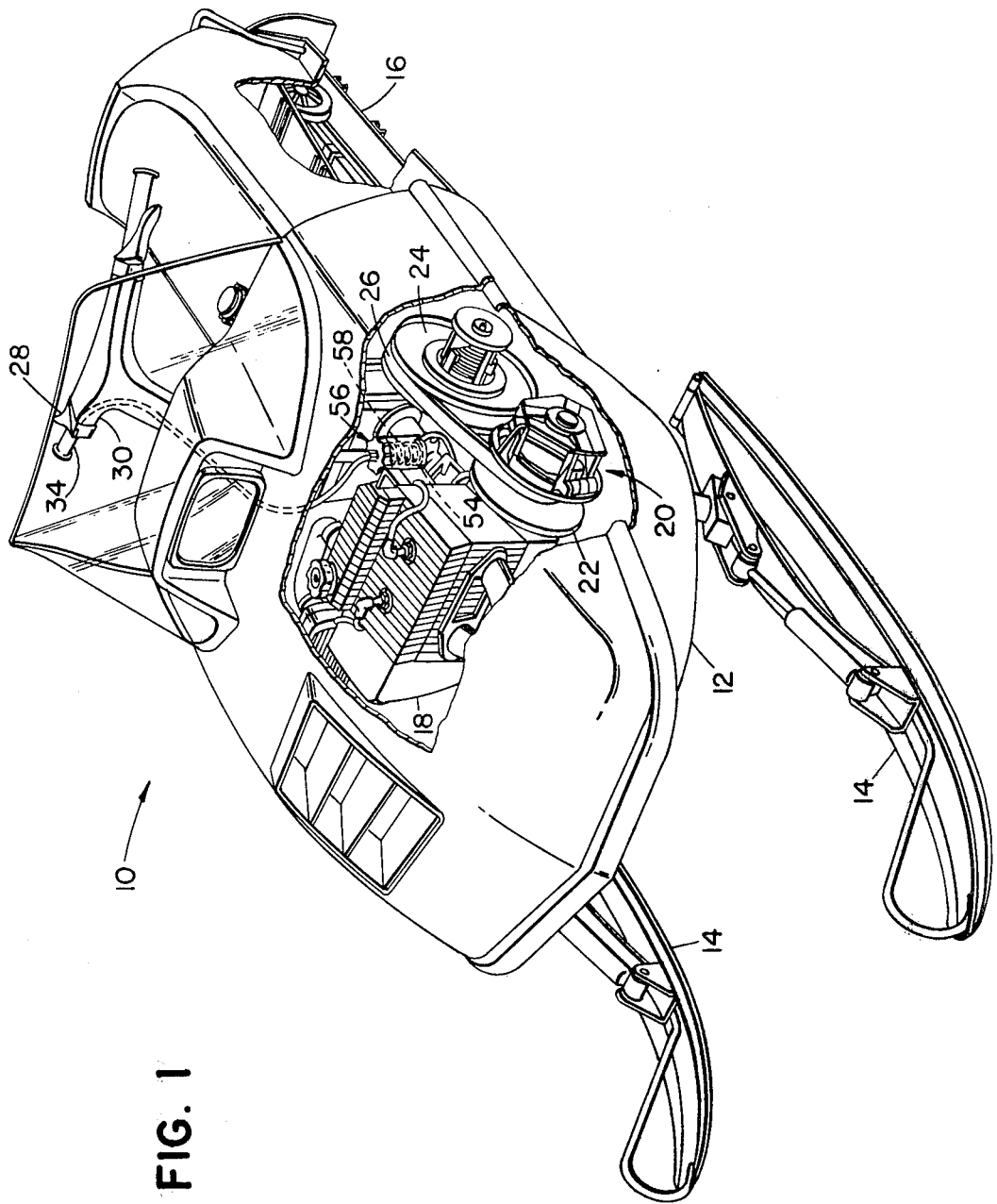
FIG. 1 is a perspective view of a snowmobile embodying the present invention.

Referring now to FIG. 1, therein is shown a snowmobile 10 including a frame 12 having a pair of skiis 14 coupled to a forward portion thereof and a drive track 16 suspended beneath a rearward portion thereof. Mounted on the forward portion of the frame 12 is an internal combustion engine 18 which is coupled via a speed responsive, variable speed drive 20, to the drive track 16 for selectively driving the latter. The drive 20 includes a variable speed primary pulley 22 connected to an output shaft of the engine 18 and a variable speed secondary pulley 24 mounted on a counter-shaft arranged parallel to the engine output shaft and connected to the primary pulley by a drive belt 26.

The drive 20 operates in a conventional manner to transmit torque to the drive track 16 only upon the R.P.M. of the engine 18 becoming equal to or exceeding a predetermined drive engagement speed at which a movable half of primary pulley 22 shifts to grip the belt 26 such that it transmits torque from the pulley 22 to the pulley 24. For example, a snowmobile engine may idle at 2,000 R.P.M. with the drive engagement speed being in the neighborhood of 3,000 R.P.M.

Figure 2:
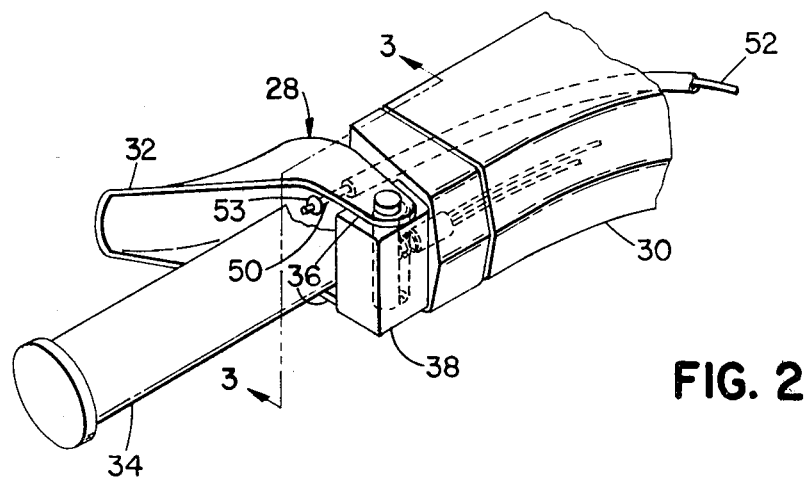
FIG. 2 is a perspective view showing the throttle control lever mounting together with the operator presence sensing switch which forms part of the R.P.M. control circuit.

The R.P.M. of the engine 18 is selectively adjusted by means of a throttle control lever 28 mounted on a right handle bar 30 of the snowmobile. As can best be seen in FIGS. 2 and 3, the lever 28 has a trigger portion 32 alongside a hand grip 34 on the end of the handle bar 30 and forming a continuation of the portion 32 are a pair of legs 36 which straddle a pivot retainer 38 fixed to the handle bar 30 and provided with a fore-and-aft elongated, transverse opening 40. A transverse pin 42 is fixed in the pair of legs 36 and is received in the opening 40 and this establishes a lost motion pivotal connection between the lever 28 and pivot retainer 38. Located in the pivot retainer 38 at a central location forwardly of the opening 40 is a bore extending in crosswise, intersecting relationship to the opening 40 and receiving a normally open operator-presence sensing switch 44 having a pair of contacts 46 terminating in the vicinity of the forward end of the opening 40 for engagement by the pin 42 to effect a closed condition of the switch when the pin moves from a rearward to a forward position in the opening 40, the pin acting as a conductor to complete the circuit between the points 46. A spring 48 is mounted between the switch 44 and the pin 42 and biases the latter towards its rearward position in the opening 40.

The trigger portion 32 of the lever 28 terminates in a forward wall portion provided with a central hole, as at 50, through which one end of a throttle control cable 52 extends, the cable 52 being kept from being pulled forwardly from the hole by a beaded end 53. The other end of the cable 52 is coupled to a pair of throttle slide valves 54 of a dual carburetor assembly 56 (only the left slide valve is visible in FIG. 1). The slide valves 54 are biased toward a starting or idle position by means of springs 58, which act through the control cable 52 to exert a pulling force on the lever 28 at the location 50 such as to urge the lever 28 in a clockwise direction, as viewed from the top in FIG. 1, about the pin 42 to normally dispose the lever in a released position, as illustrated, wherein the trigger portion 32 is separated from the hand grip 34 and the pin 42 is located rearwardly in the opening 40. It is here noted that the springs 58 offer more resistance to the movement of the lever 28 than does the spring 48 so that upon the trigger portion 32 being depressed toward the hand grip 34 the lever 28 will initially pivot about its connection with the cable 52 resulting in the pin 42 moving forwardly in the opening 40 into engagement with the switch contacts 46. Once the pin 42 engages the contacts 46, the lever will pivot about the pin 42 resulting in a pulling force being exerted on the cable 52, via the bead 53, such as to overcome the force exerted by the springs 58 and to effect opening of the throttle slide valves 54 and consequently effect an increase in engine speed. The importance of the use of the lost motion opening 40 comes into play in the event that something occurs which results in the slide valves 54 remaining in an open position when the trigger portion 32 is released by the operator. Specifically, when this occurs, the spring 48 acts against the pin 42 to disengage it from the switch contacts 46 so as to open the switch 44, the opening of the switch 44 effecting a change in the operating mode of an engine speed control system, as described hereinbelow.

Figure 3:
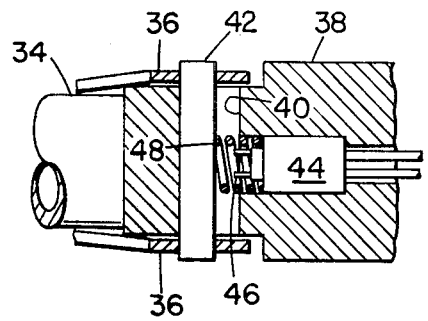
FIG. 3 is a sectional view taken along line 3—3 of FIG. 2.
Figure 4:
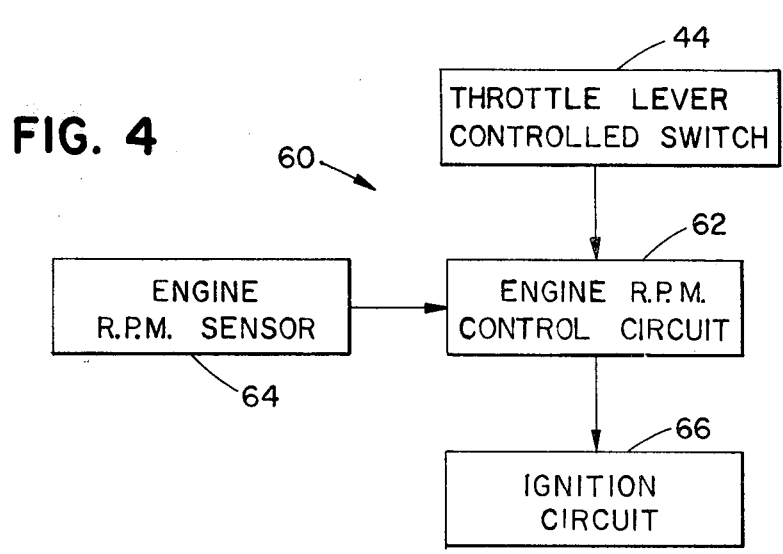
FIG. 4 is a block diagram of the engine R.P.M. control circuitry.

Referring now to FIG. 3, therein is shown a block diagram representation of an electrical engine R.P.M. control system 60. Specifically, the system 60 includes an engine R.P.M. limiting circuit 62 having an engine speed sensor 64, which may be an alternator, coupled thereto for providing an electrical input signal having a frequency that is proportional to and therefore representative of the engine speed and having the switch 44 connected thereto to provide a second input signal whenever an operator is depressing the trigger portion 32. The specific form that the circuit 62 takes is not of particular importance here however the circuits generally similar to those disclosed in U.S. Pat. No. 3,563,219, issued to Mieras on Feb. 16, 1971 and U.S. Pat. No. 3,581,720 issued to Hemphill et al on June 1, 1971, may be modified for controlling the R.P.M. of a snowmobile engine, the main modification being that for making the circuits operative not only for limiting the maximum R.P.M. of the engine, as specifically disclosed in the patents, but also for selectively limiting the R.P.M. of the engine to a value below the engagement speed of the variable speed drive 20, the mode selection of the circuit being made in accordance with the condition of the switch 44. Thus, when the switch 44 is open, the circuit 62 is in a low speed limiting mode wherein it limits the speed of the engine 18 to a predetermined low value below engagement speed of the drive 20 and when the switch 44 is closed the circuit 62 is switched to a high speed limiting mode wherein it limits the speed of the engine 18 to a predetermined high value below a value considered excessive for the engine 18 and/or the traction drive components.

Accordingly, assuming that the snowmobile engine 18 is being started and the operator has his hand removed from the throttle lever, the circuit 62 will be in its low speed limiting mode wherein the components thereof are set for controlling an ignition circuit 66 only when the input signal received from the engine speed sensor 64 indicates that the engine is at the predetermined low value. Thus, if the throttle slide valves 54 have somehow become stuck in an open position and the engine is started and the speed thereof begins to increase above its normal idling speed, the circuit 62 will act to connect the ignition circuit to ground or otherwise reduce the voltage available for firing the spark plugs of the engine 18 below that necessary for firing such as to cause the engine speed to be limited to the preselected low value. At this point the operator should be aware that the throttle valves are stuck open and shut the engine off. The necessary service and/or repairs would then be made to again make the throttle system operative.

Assuming that the throttle system is operational when the operator starts the engine 18, the engine 18 will start and idle at a speed below drive engagement speed. The drive 20 can then be engaged by depressing the trigger portion 32 of the lever 28 which depressing initially pivots the lever 28 about its connection with the throttle control cable 52 and results in the pin 42 being forced forwardly in the opening 40 against the spring 48 and into engagement with the switch contacts 46 to thus close the switch 44. Upon closing of the switch 44, the latter routes an electrical signal to the circuit 62 to cause the latter to be switched to its high speed limiting mode. The speed of the engine may then be increased upon further depression of the lever trigger portion 32, once the pin 42 reaches its forward position, as the lever 28 will now pivot about the pin 42 and exert a pulling force on the control cable 52. Under normal operations the speed of the engine 18 will not increase to the predetermined high value even when operating under full throttle. However, should the drive belt 26 or track 16 break when the full throttle conditions exists, the load will be separated from the drive 20 and the speed of the engine 18 will immediately reach said predetermined high value. Once this occurs the signal sent by the sensor 64 will actuate the components of the circuit 62 such that the latter will again ground out the ignition circuit 66 or otherwise act to decrease the voltage to the engine spark plugs below that necessary for firing the plugs and thus cause the engine R.P.M. to remain at the predetermined high value. The operator will soon become aware that drive torque is no longer being transferred to the track 16 and shut off the engine 18.

I claim:

1. An operator-presence sensing switch and throttle control, comprising: a support member provided with a transverse opening; a bore located in the support member in crosswise, intersecting relationship to the transverse opening; a switch located in the bore and having a pair of spaced contacts projecting into the opening; a throttle control lever having a pin fixed thereto and received in said opening; said opening being larger in cross-section than the pin in a direction aligned with said bore; a coil compression spring having an end received in the bore and being compressed between the switch and the pin to thereby simultaneously bias the pin away from the contacts and bias the switch into the bore; a throttle valve control means including a cable attached to the lever at a location spaced from the pin; and biasing means exerting a force on the cable which is greater than the force exerted by the spring on the pin.

* * * * *